United States Patent Office 3,449,396
Patented June 10, 1969

3,449,396
PREPARATION OF N-(2-CHLOROALKYL) SULFINYLAMINES
Donald A. Tomalia, Midland, Mich., assignor to The Dow Chemical Company, Midland, Mich., a corporation of Delaware
No Drawing. Filed Feb. 3, 1966, Ser. No. 524,834
Int. Cl. C07c *119/16*; C07d *23/00*
U.S. Cl. 260—453     8 Claims

ABSTRACT OF THE DISCLOSURE

N-(2-chloroalkyl)sulfinylamines are made by a process comprising contacting an aziridine with thionyl chloride at a temperature between −20 and 35° C. These sulfinylamines are polymer intermediates and possess anthelmintic properties.

---

The present invention concerns a new process for the preparation of N-(2-chloroalkyl)sulfinylamines. More specifically, N-(2-chloroalkyl)sulfinylamines are prepared by reacting an aziridine with thionyl chloride in accordance with the method of the present invention.

It has now been discovered that N-(2-chloroalkyl)sulfinylamines can be prepared by the reaction of an aziridine with thionyl chloride as represented by:

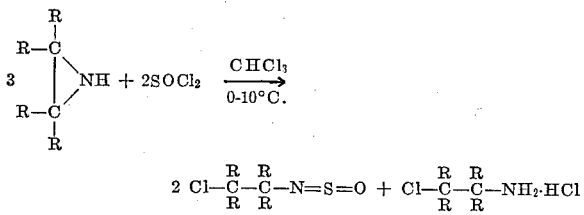

wherein at least one R is hydrogen and the other R groups are independently selected from hydrogen and alkyl groups, containing from one to four carbon atoms. The N-(2-chloroalkyl)sulfinylamine products are useful as polymer intermediates and also possess anthelmintic properties.

In the general method of the present invention, as aziridine is slowly brought into admixture with thionyl chloride and the resulting reaction of these two components yields N-(2-chloroalkyl)sulfinylamine product. The aziridine and thionyl chloride are preferably admixed in the presence of an aprotic organic solvent which is inert under the reaction conditions. A temperature of from about −10° to about 35° C. is maintained during the reaction with a temperature of 0° to 24° C. preferred. The aziridine solution is preferably added to the thionyl chloride solution in a dropwise manner to avoid undesirable polymer formation which may occur to an appreciable extent, e.g. as a side reaction, at more rapid addition rates or upon addition of thionyl chloride to aziridine where an excess of aziridine contacts the thionyl chloride. A molar ratio of aziridine:thionyl chloride of 1:1 is preferred, but a larger proportion of thionyl chloride can be employed if desired. An increase in the relative amount of aziridine employed, however, usually results in a decreased yield of the desired product and in the formation of unwanted polymeric products.

Examples of aziridine starting materials which can be employed in the method of the present invention include ethylenimine, 2-methylaziridine, 2,2-dimethylaziridine, 2,3-diethylaziridine, 2-propylaziridine, 2-n-butylaziridine and 2,3-di-n-butylaziridine.

The preferred solvent employed in the method of the present invention is chloroform. Other suitable inert organic solvents include hydrocarbons, chlorinated hydrocarbons and ethers, e.g. benzene, hexane, methylene chloride, carbon tetrachloride, perchloroethylene, diethyl ether and dioxane.

A variation of the above-described inventive method involves the admixture of an aziridine and thionyl chloride in the presence of a tertiary amine acid acceptor to form new compositions, i.e. 1-aziridinesulfinyl chlorides, which can subsequently be isomerized to the corresponding N-(2-chloroalkyl)sulfinylamines. This variation may be represented, for example, by the reaction of ethylenimine with thionyl chloride in the presence of triethylamine and employing carbon tetrachloride as a solvent:

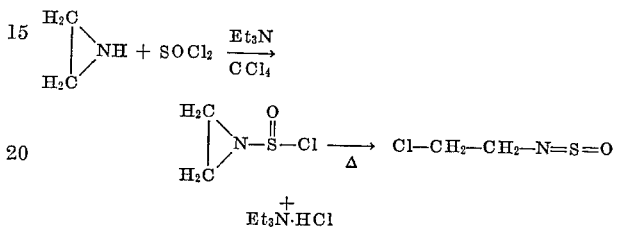

A reaction temperature of from about −20° to about 5° C. is employed to form the 1-aziridinesulfinyl chloride and the temperature is subsequently raised to about 25° C. to facilitate rearrangement to the corresponding N-(2-chloroalkyl)sulfinylamine. At temperatures above about 5° C., isomerization to the N-(2-chloroalkyl)sulfinylamine begins to occur and at temperatures above about 25° C. yields of N-(2-chloroalkyl)sulfinylamine are lowered due to polymer formation. Use of an inert solvent, as defined above, in which the acid acceptor salt is insoluble is advantageous in order to obtain improved yields of the desired product. Useful acid acceptors are tertiary amines such as, for example, pyridine and triethylamine.

The following examples are illustrative of the present inventive method and new compositions but are not to be interpreted as limitative.

EXAMPLE 1

A solution of 57 grams of 2-methylaziridine (1.0 mole) in 300 ml. of anhydrous chloroform at a temperature of 0–10° C. was added dropwise over a period of 45 minutes to a solution of 118.9 g. (1.0 mole) of thionyl chloride in 400 ml. of dry chloroform contained in a one liter flask equipped with a stirrer, condenser and addition funnel. During this addition the ensuing reaction mixture was continuously stirred and maintained at a temperature below 15° C. The homogeneous reaction mixture was allowed to stand. No precipitated amine salt was observed after 20 hours at about 25° C. Approximately 50 percent of the chloroform solvent was then distilled from the reaction mixture under reduced pressure and the reaction mixture allowed to stand for 1 hour at approximately 25° C. At the end of this time a quantity of amine salts crystallized out of solution and these were filtered off in a nitrogen filled dry box and washed with two 25 ml. aliquots of ethyl ether. The orange-brown filtrate was separated from the remaining chloroform by fractional distillation and subsequently yielded a major fraction boiling at 66–67° C. at 43 mm. Hg. pressure. The weight of this fraction was 69.5 grams, equivalent to 50 percent theoretical yield. Nuclear magnetic resonance (N.M.R.) analysis showed this fraction to contain 29 mole percent of N-(1-methyl-2-chloroethyl)sulfinylamine and 71 mole percent of N-(2-chloropropyl)sulfinylamine. This mixture of the two isomers fumed on exposure to a humid atmosphere.

The analysis for $C_3H_6ClNOS$ showed C=25.68%, H=4.50%, and Cl=25.08% as compared to the calculated values of C=25.81%, H=4.33% and Cl=25.40%.

EXAMPLE 2

A one liter flask equipped with a stirrer, a reflux condenser surmounted by a CaCl₂ drying tube, and an addition funnel was charged with 59.5 g. (0.5 mole) of thionyl chloride dissolved in 300 ml. of dry chloroform. This solution was cooled to 0–5° C. and stirred while a solution of 21.5 g. of ethylenimine in 200 ml. of dry chloroform was added to the flask in dropwise fashion over a 30 minute period. The reaction temperature was maintained at 0–8° C. during this addition. After the addition was complete, the reaction mixture was stirred for 15 minutes at about 25° C. and then allowed to stand for one hour. A dark brown amine salt precipitated during this time period and was filtered off and washed with 20 milliliters of chloroform. The solvent was removed from the filtrate under vacuum to yield a light orange liquid residue. Distillation of this residue on a 24″ x ¼″ Vigreux column gave 28.8 g. (46 percent of theoretical yield) of a colorless fraction boiling at 62 to 64° C. at 33 mm. Hg. pressure. This product, N-(2-chloroethyl)sulfinylamine, fumed on exposure to humid atmosphere and decomposed rapidly upon contact with water. Analysis for $C_2H_4ClNOS$ showed 19.03 weight percent carbon, 318 percent H, 25.15 percent S, and 27.85 percent Cl which compares to the theoretically calculated amounts: C=19.13%, H=3.21%, S=25.54%, and Cl=28.24%.

EXAMPLE 3

A quantity of 0.5 mole of thionyl chloride in 250 milliliters of dry chloroform was stirred in a one liter flask equipped with a condenser and addition funnel while a solution of 2,2-dimethylaziridine (0.5 mole) in 150 milliliters of anhydrous chloroform was added dropwise over a period of 45 minutes. The temperature was maintained between about 0 and 10° C. during this time A substantial amount of white precipitate formed during the addition. After addition the reaction mixture was allowed to stand at room temperature for two days. The amine salts were filtered off, washed with two portions of ethyl ether and freed of solvent by vacuum distillation. The resulting light yellow liquid residue was distilled to produce an initial fraction of 6.5 grams having a boiling point of 40° to 69° C./42 mm., and a major fraction weighing 25.33 g. (33% theoretical) and boiling at 69–70.5° C./42 mm. N.M.R. analysis of this latter fraction indicated that it consisted of only one isomer, N(2-chloro-2 - methylpropyl)sulfinylamine. The first fraction was found to be a mixture of the two possible isomers. Total yield of both isomers was 21.83 g. (41.4 percent theoretical). Quantitative analysis showed C=31.25 weight percent, H=5.28%, N=9.02% and Cl=22.82% which compares with the calculated values for $C_4H_8ClNOS$ of C=31.27%, H=5.25%, N=9.12% and Cl=23.08%.

EXAMPLE 4

A solution of 0.1 mole thionyl chloride dissolved in 125 ml. of anhydrous carbon tetrachloride was placed in a 500 ml. flask equipped with a stirrer, condenser and addition funnel. This solution was stirred at 0°–5° C. while a solution of 0.1 mole ethyleneimine dissolved in 75 ml. of dry carbon tetrachloride containing 0.1 mole of triethylamine was added dropwise over a period of 45 minutes. The temperature was maintained at not greater than 5° C. during this addition. After completion of the addition, the reaction mixture was stirred for 15 minutes longer and then filtered into a flask precooled to 0° C. The light yellow filtrate was scanned (N.M.R.) immediately at a probe temperature of −15° C. The spectrum showed the expected signlet at −2.61 p.p.m. identifying the 1-aziridine-sulfinyl chloride structure.

The carbon tetrachloride solution of the 1-aziridine sulfinyl chloride was allowed to warm up to approximately 25° C. and the rearrangement to the N-(2-chloroethyl) sulfinylamine isomer was followed by N.M.R. spectroscopy. Within one hour at this temperature, two downfield triplets at −4.26 and −3.67 p.p.m. were observed to form while the singlet at −2.61 p.p.m. decreased in intensity. After 20 hours the singlet disappeared while the downfield triplets had developed substantially. This spectrum was identical to the spectrum of an authentic sample of N-(2-chloroethyl)-sulfinylamine. After removing the solvent, the light yellow liquid residue was distilled to give a major fraction weighting 6.03 g. (48 percent theoretical) and boiling at 62–64° C./33 mm. Hg. pressure.

EXAMPLE 5

The procedure and materials of Example 4, above, were employed with the single exception that 0.1 mole of 2-methyl aziridine was used in place of ethyleneimine. The resulting sulfinyl chloride structure was confirmed by the results of an N.M.R. spectrum which showed two downfield doublets at −1.46 and −1.55 p.p.m. and −2.34 and −2.41 p.p.m. as well as a complex multiplet centered at −2.82 p.p.m. An integration of these proton resonance peaks was consistent with the structure of 1-(2-methyl-aziridine)sulfinyl chloride. The carbon tetrachloride solution of this sulfinyl chloride was warmed to 25° C. and isomerization of the aziridine derivative followed by N.M.R. spectroscopy. The aziridine proton absorption peaks disappeared while resonance bands characteristic of the isomeric sulfinylamines began to appear. This isomerization was complete after 25 hours at 25° C. Removal of the solvent and distillation of the residual liquid yielded a major fraction weighing 7.5 g. (54 percent theoretical) and boiling at 70–71° C./42 mm. Hg. pressure.

I claim:

1. A method for the preparation of an N-(2-chloroalkyl)sulfinylamine having the formula

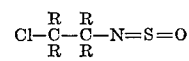

which comprises reacting by contacting an aziridine having the formula

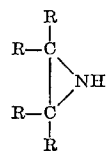

with at least the stoichiometric amount of thionyl chloride at a reaction temperature between about 0 and 25° C. and recovering the N-(2-chloroalkyl)sulfinylamine from the reaction mixture, where in each of the above formulas, at least one R is hydrogen and the other R groups are independently selected from hydrogen and alkyl groups containing from one to four carbon atoms.

2. A method for the preparation of an N-(2-chloroalkyl)sulfinamine having the formula

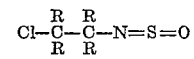

which comprises reacting by contacting an aziridine having the formula

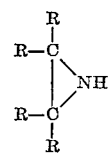

with at least the stoichiometric amount of thionyl chloride, in the presence of a tertiary amine acid acceptor and an inert, aprotic, organic solvent, at a reaction temperature between about −20° and 5° C. and thereafter raising the temperature of the reaction mixture to between about 20° and 30° C. and recovering the N-(2-chloroalkyl)sulfinylamine from the reaction mixture, where in each of the above formulas, at least one R is hydrogen and the other R groups are independently selected from hydrogen and alkyl groups containing from one to four carbon atoms.

3. The method of claim 1 wherein the aziridine and thionyl chloride are admixed in the presence of an inert, aprotic, organic solvent.

4. The method of claim 1 wherein the aziridine is 2-methylaziridine.

5. The method of claim 1 wherein the aziridine is ethylenimine.

6. The method of claim 1 wherein the aziridine is 2,2-dimethylaziridine.

7. The method of claim 2 wherein the aziridine is ethylenimine.

8. The method of claim 2 wherein the aziridine is 2-methylaziridine.

References Cited

UNITED STATES PATENTS

| | | | |
|---|---|---|---|
| 3,197,465 | 7/1965 | Woods et al. | 260—239 |
| 3,236,887 | 2/1966 | Hooks et al. | |

FOREIGN PATENTS 59,062  11/1890  Germany.

OTHER REFERENCES

Ethylenimine, the Dow Chemical Company, 1963, p. 4.

Chemical Abstracts, vol. 44, 5805i–5807g.

Houben-Weyl; Methoden der Organische Chemie, vol. XI-2, p. 249.

CHARLES B. PARKER, *Primary Examiner.*

S. T. LAWRENCE III, *Assistant Examiner.*

U.S. Cl. X.R.

260—79, 79.7, 239, 551, 999